United States Patent [19]

Peacock

[11] 4,310,767

[45] Jan. 12, 1982

[54] DATA INTERFACE BETWEEN ROTATING AND NONROTATING MEMBERS

[75] Inventor: Richard A. Peacock, Colorado Springs, Colo.

[73] Assignee: Wyle Laboratories, El Segundo, Calif.

[21] Appl. No.: 29,050

[22] Filed: Apr. 11, 1979

[51] Int. Cl.³ .............................................. G02B 27/00
[52] U.S. Cl. ................................... 250/551; 250/578; 455/602
[58] Field of Search ....................... 250/227, 578, 551; 455/600-620; 307/311

[56] References Cited

U.S. PATENT DOCUMENTS

| | | | |
|---|---|---|---|
| 4,165,913 | 8/1979 | Fitch | 250/227 |
| 4,166,959 | 9/1979 | Ivie | 250/551 |
| 4,178,515 | 12/1979 | Taresevitch | 250/551 |
| 4,190,318 | 2/1980 | Upton | 250/551 |

Primary Examiner—David C. Nelms

Attorney, Agent, or Firm—Freilich, Hornbaker, Wasserman, Rosen & Fernandez

[57] ABSTRACT

A data interface for a railcar truck assembly, to transmit the outputs of transducers located on the rotating axle to circuits on the stationary frame of the truck. The data transmission system includes a group of several light emitting elements located on the axle and angularly spaced thereabout, and with all elements driven simultaneously at a high frequency to produce modulated light representing data. A light sensitive cell on the frame receives the light, to generate a signal which passes through a high-pass filter and is demodulated or demultiplexed to provide an output representing the transducer signals on the rotating axle. The photocell is spaced far enough from the axle, that it is outside the circle of interrupted illumination, so that the photocell is always within the half power beam of at least one of the light emitters on the axle. An auxiliary optical transmitter is located on the frame, and emits light to a group of auxiliary photocells on the axle, to provide mode control data feed back to the axle to operate the power supply and signal processing circuitry on the axle.

10 Claims, 7 Drawing Figures

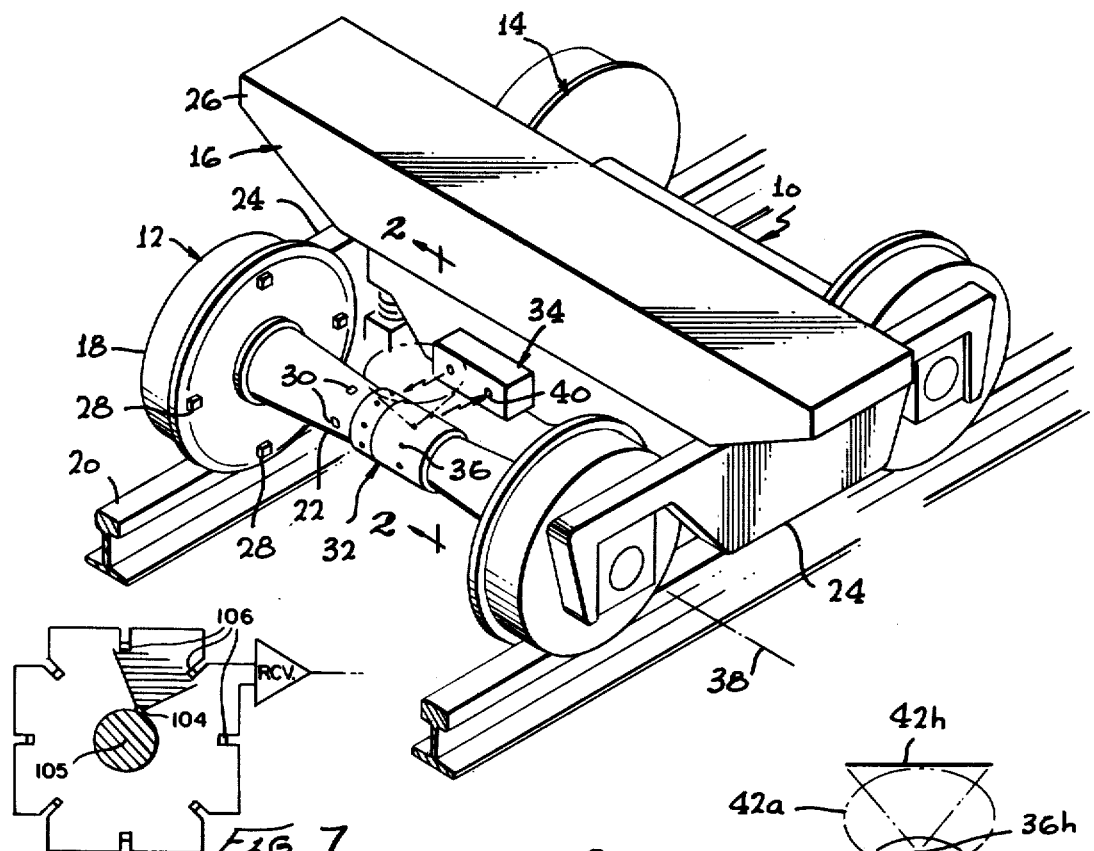
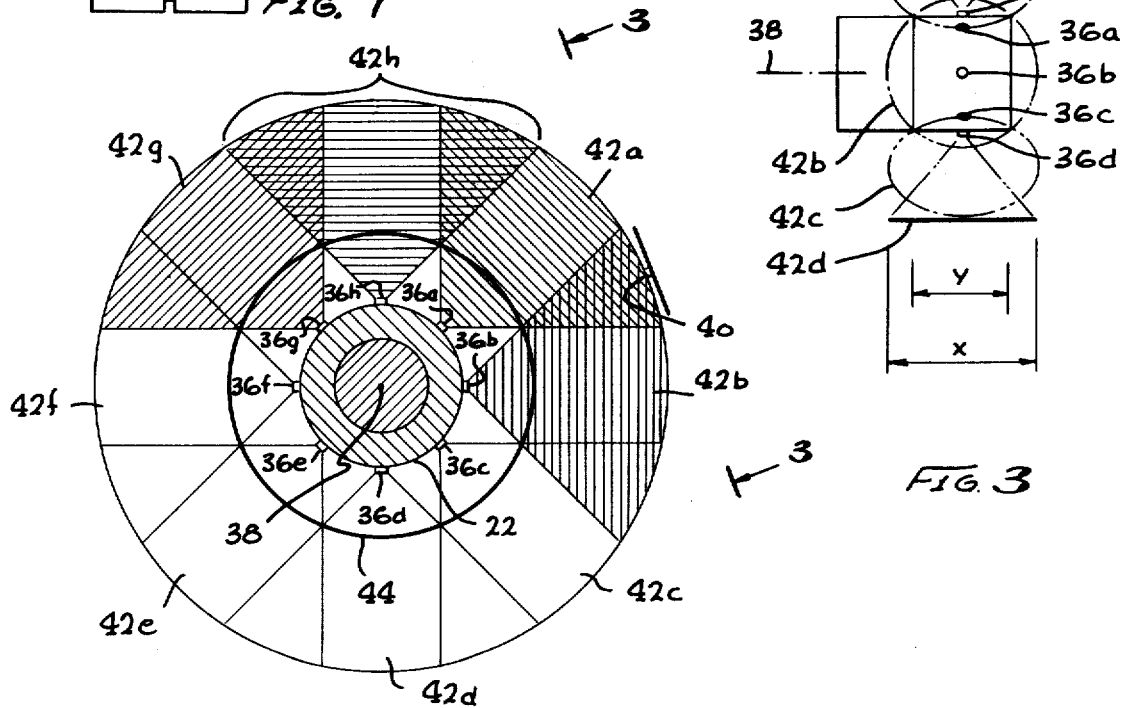

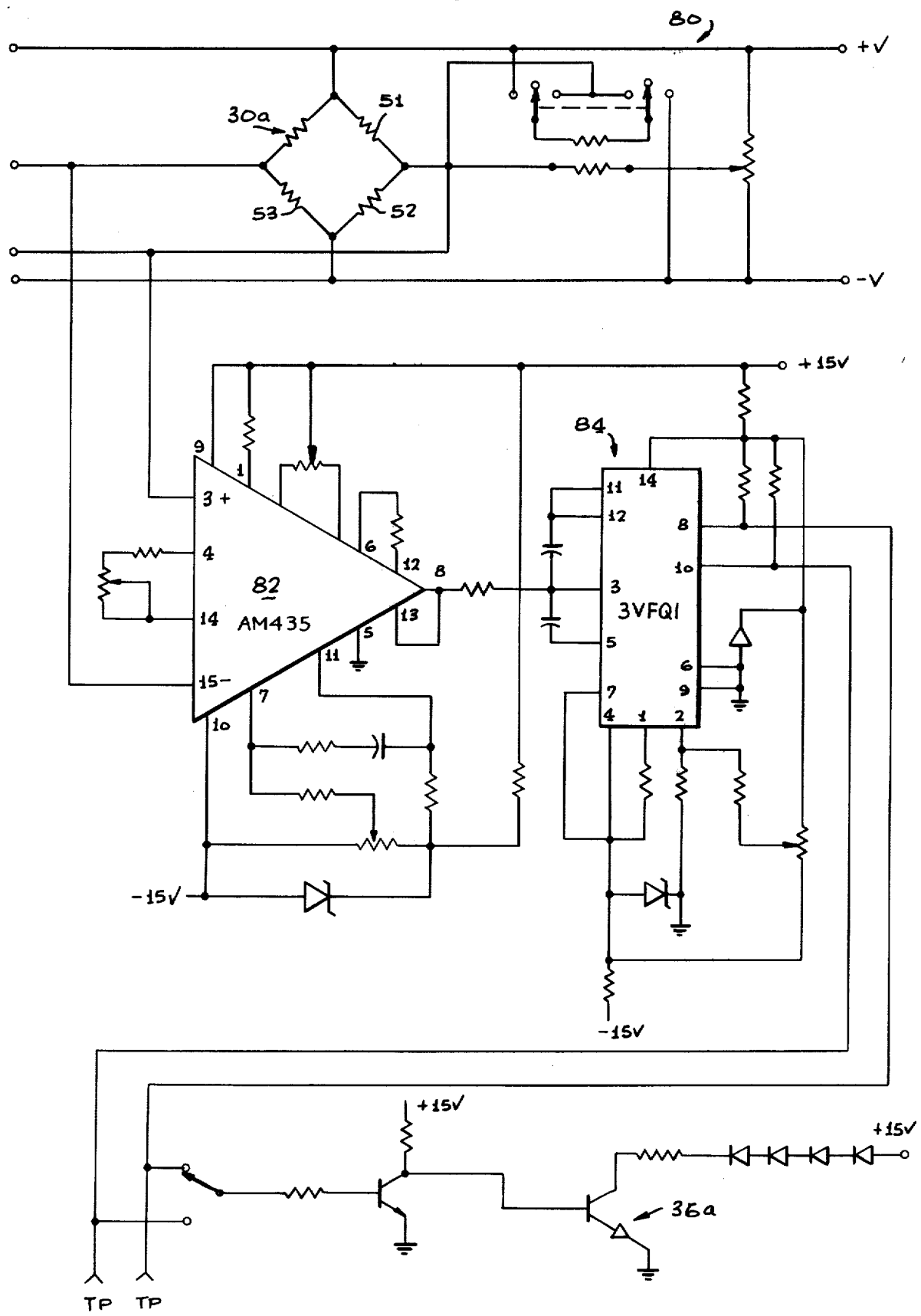

DATA INTERFACE BETWEEN ROTATING AND NONROTATING MEMBERS

BACKGROUND OF THE INVENTION

A railroad truck assembly can be utilized to measure the condition of the railroad track and the effect of adverse conditions on the trucks of the railcars. The most sensitive measurements can be made by mounting transducers directly on the wheels and axles of a railcar truck, to avoid absorption of shocks that occurs during their transmission through springs to the frame of the truck assembly. However, if transducers are to be mounted on the rotating shaft, provisions must be made to provide an interface between the transducers and circuitry on the stationary frame (which travels with the wheel but does not rotate). Since the axle is mounted on springs and is subjected to considerable shocks during high speed travel, any data interface must operate reliably despite considerable sudden movements of the axle with respect to the frame. The interface apparatus, as well as the transducers and processing circuitry to be mounted on the axle, should all be mountable without requiring disassembly of the truck assembly, and without altering it enough to appreciably affect the measurements, so that the measurements represent approximately the effects of the rails on ordinary truck assemblies. Optical techniques are well known for use in data transmission between stationary bodies, but special problems arise where one of the bodies is rotating rapidly with respect to the other.

SUMMARY OF THE INVENTION

In accordance with one embodiment of the present invention, a data transmission system is provided for use in a railroad truck assembly to transmit data between a rotating axle and a non-rotating frame. The system includes a transducer circuit connected to an optical transmitter device on the shaft, which has at least one light emitting optical element. An optical receiver device is mounted on the frame opposite the transmitter device, and the receiver device has at least one light sensitive optical element for generating signals that are delivered to signal processing circuitry on the frame. One of the devices, such as the transmitter on the shaft, includes at least three optical elements angularly spaced about the axis of rotation of the shaft, so there is always transmission of light of at least moderate intensity between the transmitter and receiver devices during rotation of the shaft.

In one system, eight light emitting diodes are mounted on the shaft, while one photodiode is mounted on the frame. The photodiode is far enough from the axis of the shaft, that it can intersect the overlapping beams of adjacent light emitters on the shaft, so that the photodiode is always illuminated by the half power beam of at least one of the light emitters. A high pass filter is connected between the photodiode and the signal processing circuitry, to stop the passage of light flicker arising from shaft rotation, as well as other low frequency noise. The data from the transducers are converted to high frequency signals that are utilized to drive the photodiodes, so that such signals can pass through the high-pass filter between the photodiode and processing circuitry.

The novel freatures of the invention are set forth with particularity in the appended claims. The invention will be best understood from the following description when read in conjunction with the accompanying drawings.

BRIEF DESCRIPTION OF THE DRAWINGS

FIG. 1 is a perspective view of a railroad truck assembly, shown on a railroad track.

FIG. 3 is a representational view taken on the line 3—3 of FIG. 2.

FIG. 4 is a block diagram of the circuitry of the apparatus of FIG. 1.

FIG. 5 is a schematic diagram of a simplified axle-mounted circuit which could be utilized in the assembly of FIG. 1.

FIG. 7 is a representational view of a further embodiment of the invention.

DESCRIPTION OF THE PREFERRED EMBODIMENTS

Figure 2:
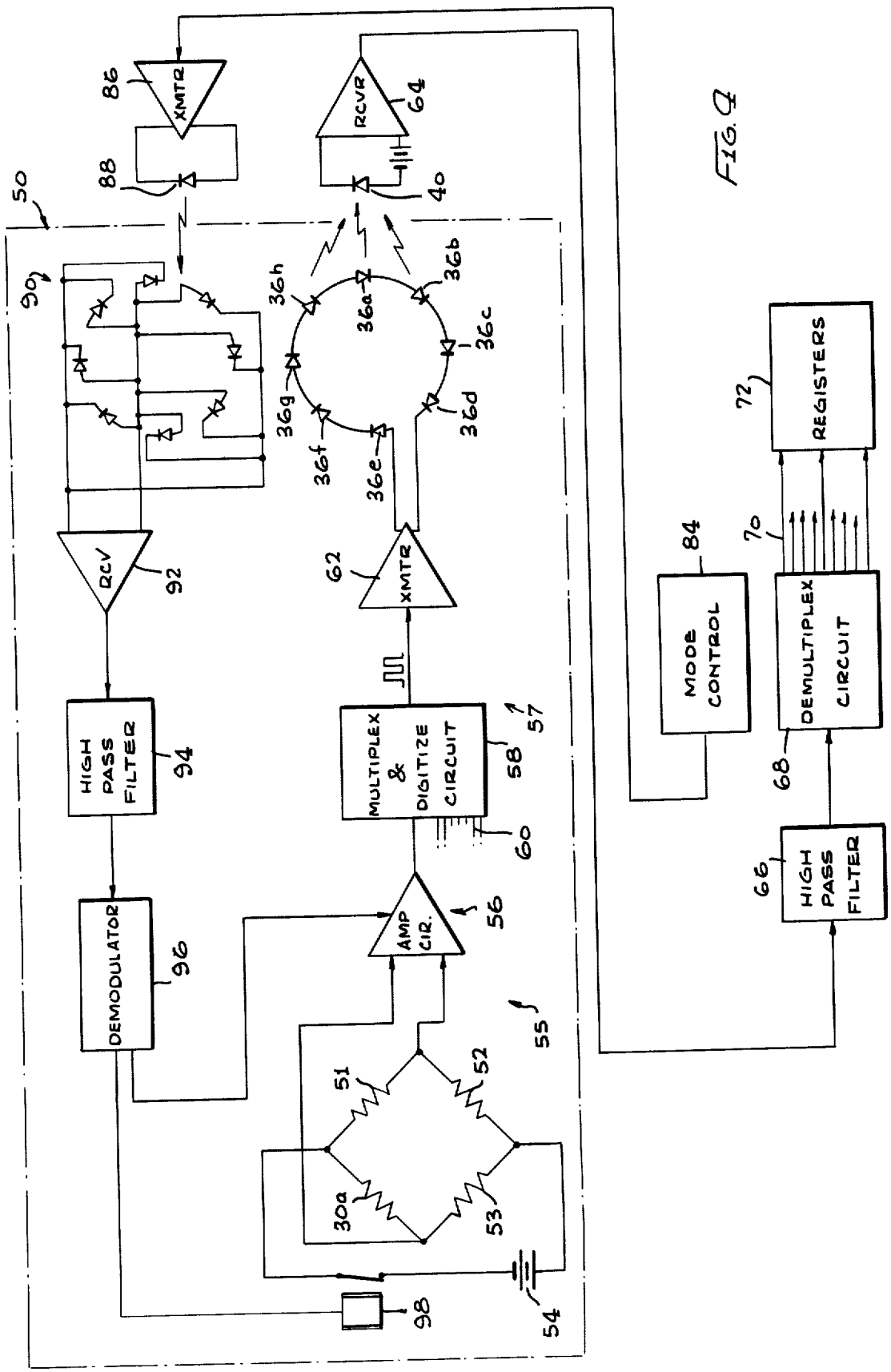
FIG. 2 is a representational view, taken on the line 2—2 of FIG. 1, showing the light beam pattern generated by the transmitter device thereof.

FIG. 1 illustrates a railroad truck assembly 10 which includes a pair of wheel and axle assemblies 12, 14 that are supported on a frame 16. The wheels 18 ride on rails 20 and support axles 22. The axles 22 are rotatably supported on bearings held by intermediate members 24 of the frame that are mounted by springs to a bolster 26 of the frame. In order to measure the condition of the rails 20, and more particularly the effect of rail irregularity on the wheel and axle assembly 12, transducers are mounted on the wheel and axle assembly. The transducers may, for example, include a group of accelerometers 28 mounted about the wheels to measure shocks transmitted to the wheels, and a group of strain gages 30 mounted on the axle to measure bending thereof resulting from the shocks. A transmitter device 32 and a corresponding receiver device 34 are respectively mounted on the axle assembly and frame, to transmit signals representing the outputs of the transducers 28, 30 to processing circuitry mounted on the frame. Such processing circuitry can include recorders and the like that record the outputs of the transducers to enable later analysis of the rail and truck interaction.

The transmitter device 32 includes a group of light emitting optical elements 36 such as light emitting diodes, which are angularly spaced about the axis 38 of the shaft. The receiver 34 includes a light sensitive optical element 40 such as a photodiode, which can receive the light emitted from the light emitting elements. The transducers on the wheel and axle assembly are connected through transducer circuits to the light emitting elements 36 to energize them so as to transmit modulated light that is picked up by the light sensitive element 40. The output of the element 40 therefore represents the outputs of the transducers.

If the light emitting elements 36 were stationary, then a single light emitting element 36 could be utilized to transmit light, and therefore data to the light sensitive element 40. However, the shaft and light emitting elements thereon will rotate rapidly when the truck assembly is moving along the rail, and therefore a single light emitting element will only occasionally flash its light onto the photo-sensitive element. As shown in FIG. 2, eight of the light emitting elements 36a–36h are mounted on the shaft 22. The light emitting elements are angularly spaced by 45° from one another about the axis of the shaft. The half power beams 42a–42h of the light emitting elements are shown, for elements whose half power beams subtend a 90° angle as viewed in a sectional view taken along the axis of the element.

Within a circle of interrupted illumination 44, the half power beams from the emitters do not overlap one another. If a light sensitive element such as 40 were placed closer to the axis 38 of the shaft than the circle 44, then such an element would receive flashes of light of high intensity, separated by times during which very little light were received from any light emitting element. To avoid this, the light sensitive element 40 is placed outside the circle 44, so that the element 40 always lies within the half power light beam width from at least one of the light emitting elements 36. It can be seen that the light sensitive element 40 will sometimes receive considerable light from two adjacent light emitters such as 36a and 36b, and at other times will receive considerable light from only one of the light emitting elements. All of the elements 36a–36h are driven substantially in synchronism, so that light from any two adjacent elements reinforce one another rather than interferring.

Although the light sensitive element 40 should be placed outside of the circle of interrupted illumination 44, it is not desirable to place the element 40 either far outside the circle or immediately outside the circle. Placing the element 40 too far outside the circle results in a low level of illumination, since the illumination intensity decreases with the square of the radial distance from the element 40 to the adjacent light emitting element. However, the placement of the light sensitive element 40 a moderate distance outside of the circle 44 is useful to assure its illumination in spite of small axial shifts or yawing of the axle with respect to the frame to which it is spring mounted. FIG. 3 shows how the cones of light 42 from the light emitters ovrlap. Although each half power beam has a considerable width X as viewed at the distance of the light sensitive element 40, there is a smaller width Y of overlapping of the beams. At the circle of interrupted illumination 44 in FIG. 2, the beams 42 have a substantial width, but they overlap along only a very narrow band. As a result, if the light sensitive element were positioned slightly off that band of overlapping, the element would not always receive light from at least one of the emitter elements within the half power beam therefrom. By positioning the light sensitive element 40 a considerable distance outside the circle 44, data transmission is continued reliably despite slight axial shifting and yawing of the ring of light emitters 36 with respect to the light sensitive element 40.

FIG. 4 is a simplified illustration of the circuitry of the apparatus of FIG. 1, which includes an axle mounted circuit 50, and additional elements that are mounted on the frame of the truck assembly. The axle mounted circuit 50 comprises a transducer circuit 55 which includes a strain gage transducer 30a and three resistors 51–53 connected in a balanced bridge arrangement, a voltage source 54 connected to one pair of junctions of the bridge to energize it and an amplifier and conditioning circuit 56 connected to the other junctions of the bridge. The output of the amplifier circuit 56 represents changes in the resistance of the transducer 30a, and therefore strain of the axle. The output of the circuit 56 is delivered to a transmitter device 57 that includes a multiple digitizer circuit 58, a transmitter 62, and the light emitting elements 36. The digitizer circuit 58 converts the analog signal from the amplifier 56 to a digital signal. The digitizing circuit 58 receives inputs on lines 60 from several other transducers on the wheel and axle assembly and also converts them to digital signals. The circuit 58 also includes a portion that multiplexes the signals received on its various inputs 60 and delivers them, as in a pulse modulated code, to a transmitter 62. The pulse code can be of a type which includes an encoded clock or start signal, followed by trains of pulses that each represent the output from a different transducer. The transmitter 62 serves as a driver for driving the light emitting elements 36a–36h. As discussed above, the group of light emitting elements 36 are driven in synchronism, so that their overlapping light beams reinforce rather than create interference. Typical light emitting diode devices can be driven at low voltages, and a group of eight of them can be driven simultaneously as by connecting them in series as shown in FIG. 4. The light emitted by the elements is flashed on and off in accordance with the pulse code modulation, at a high frequency such as 10 MHz. The light is detected by the photodiode light sensitive element 40, whose change in resistance is detected by a receiver device which includes a receiver 64 and a high pass filter 66.

The output of the receiver 64 is delivered through the high-pass filter 66 to a signal processing circuit which includes a demultiplex circuit 68. The high-pass filter 66 is designed to filter out low frequency signals such as those resulting from the repeated flashing of the light emitting elements onto the photodiode as the axle rotates. For example, a wheel which is about two feet in diameter and that travels along rails at about 50 mph, will rotate at about 12 revolutions per second. The eight light emitting elements 36 therefore will create flashes on the photodiode 40 at a frequency of about 100 Hz. By utilizing a high-pass filter 66 of a 3 db frequency of 1 KHz, which filters out frequencies below a few hundred Hz, only the high frequency information signals reach the demultiplex circuit 68 and the effects of the flashing light beams from the rotating axle are substantially eliminated. The rotation of the axle causes changes in the level of illumination of the photodiode and therefore of its susceptibility to high frequency noise, but since the half beams overlap the photodiode always produces a strong signal. The high-pass filter 66 is also useful in eliminating low frequency noise from power lines and the like.

The demultiplex circuit 68 produces outputs on a group of lines 70 representing the signal level from each of the group of transducers on the wheel and axle assembly. These outputs can be delivered to a group of registers 72, which may be electronic register circuits, chart recorders for recording changes in transducer levels with time, or on-board analyzing and computing circuitry.

Although the major function of the apparatus is to transmit data from the transducers on the wheel and axle assembly to circuitry on the stationary frame, it is also desirable to provide reverse data communication from the frame to the axle assembly to enable control of the axle-mounted apparatus. A mode control circuit 84 (FIG. 4) on the frame operates an auxiliary transmitter device which includes a transmitter circuit 86 and a light emitting element 88 on the frame. Light from the element 88 is transmitted to an auxiliary receiver on the axle, which includes a group of light sensitive elements 90 mounted about the axle in the same manner as the group of light emitting element 36, but with the auxiliary elements 90 preferably axially spaced from the emitting elements 36. The outputs of the auxiliary light sensitive elements 90 are connected in parallel to a receiver circuit 92, whose output passes through an auxiliary high-pass filter 94 to an auxiliary demodulator circuit 96. The output of the demodulator 96 can be utilized to operate a relay 98 that can terminate the delivery of power to the transducers such as 30a. The resistance elements, such as transducer 30a, in a balancing bride, consume a large portion of the power required when the axle-mounted equipment is operated, and turning off the power when readings are not being taken can prolong the life of batteries or other circuit components on the axle. The output of the demodulator 96 also can be delivered to the amplifier and conditioning circuit 56, as to enable calibration of the transducers. This can be accomplished by the use of logic circuitry responsive to the output of demodulator 96, which substitutes a precision resistor for the transducer 30a, to enable calibration of the transducer 30a.

Figure 6:
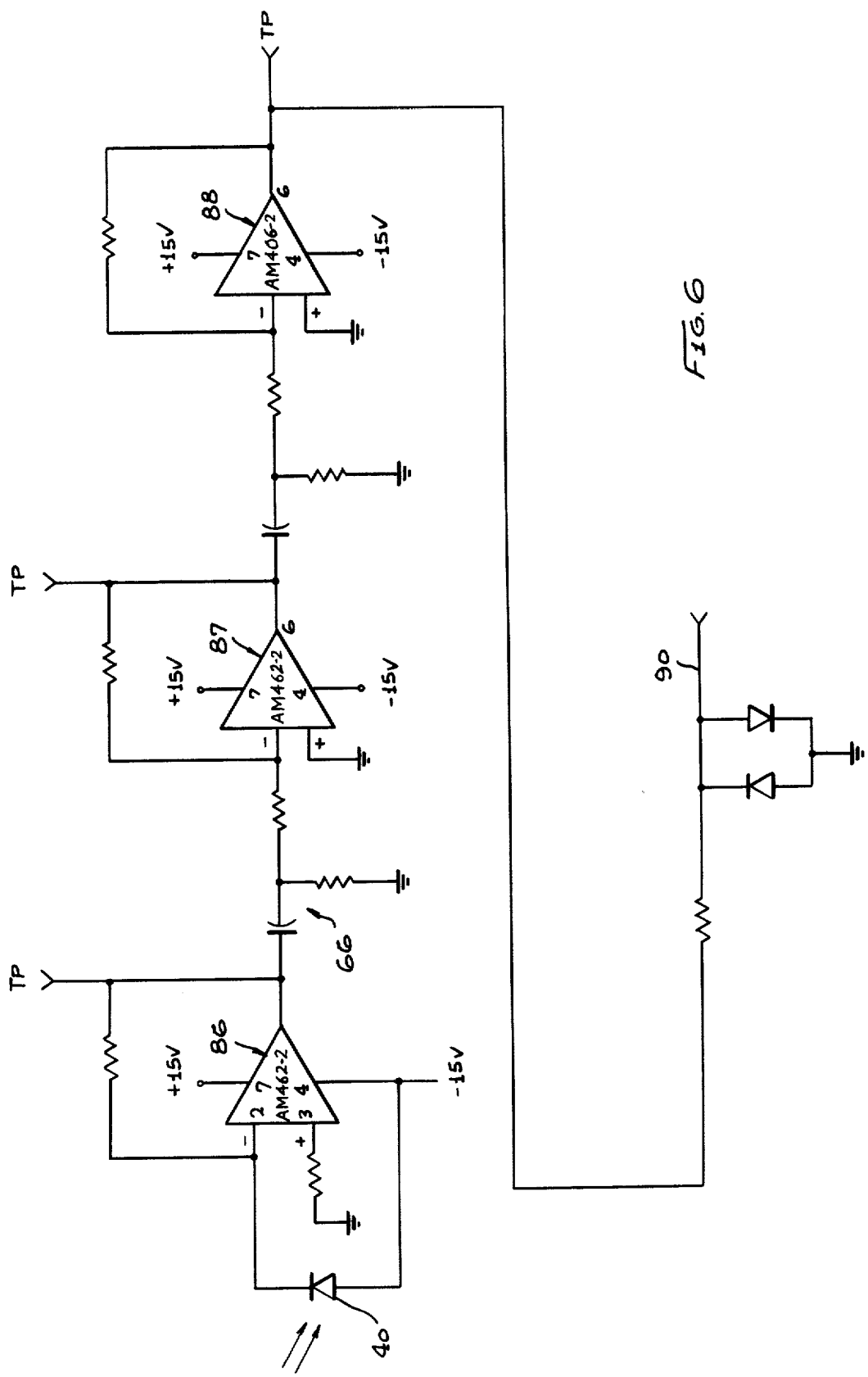
FIG. 6 is a schematic diagram of a simplified frame-mounted circuit which could be utilized in the apparatus of FIG. 1.

FIG. 5 illustrates an axle-mounted circuit 80 which has been constructed to demonstrate the transmittal of the output of one transducer 30a. The output of the balanced bridge is delivered through an amplifier 82 to a voltage to frequency converter 84, whose output is delivered to a light emitting diode 36a. The output of the diode 36a is pulsed at a frequency dependent on the output of the transducer 30a. FIG. 6 shows an optical receiver circuit, which includes the photodiode 40 whose output is delivered through a high-pass filter 66 and several amplifying and squaring circuits 86-88, whose output on line 90 is a digital signal whose frequency represents the resistance of the transducer 30a in FIG. 5. For multiple transducers, multiplexing and demultiplexing circuits of well known types can be utilized to transmit the data. Power from operating the circuits on the wheel and axle assembly, can be obtained from electrical batteries or by power transmission between the frame and axle as by an air core transformer.

Thus, the invention provides a data transmission system for transmitting data between a rotating body and a non-rotating one, as to transmit the output of transducers on a wheel and axle assembly of a railroad truck to the relatively stationary frame. This can be accomplished by utilizing an optical transmitter device with at least one light emitting element on the axle, and an optical receiver device with at least one light sensitive element on the frame, with one of the devices having a group of elements spaced about the axis of rotation of the axle. Typical emitters and detectors have emitter or view angles of between 30° and 130°, so that a minimum of three light-emitting elements normally will be required for an axle-mounted transmitter that is to illuminate a single frame-mounted receiver. In the above-described system, a group of eight light emitting elements are mounted on the axle so that a single light sensitive element on the frame is always illuminated by at least one of the light emitting elements, for elements of about a 90° emitting angle and where the photocell is to be reasonably close to the axle. It would be possible to utilize a single light emitting element on the axle and to position perhaps eight light sensitive elements on the frame on a circular frame portion that surrounded the axle. FIG. 7 shows such an arrangement wherein one emitting element 104 on a member rotating about axis 105, illuminates light sensitive elements 106 on a stationary member, with the light sensitive elements connected to a receiver similar to receiver 92 in FIG. 4. However, the mounting of such a hollow circular member is normally more inconvenient than merely mounting a group of elements on the axle. The light sensitive element should be located far enough from the axis of rotation, that it is outside the circle of interrupted illumination within which the half power beam widths from the transmitter devices do not overlap, to assure that the light sensitive element is always within the half power beam width of a beam from one of the light emitting elements. The data from the transducer is modulated at a high frequency, in either an analog or digital manner (to produce pulses), and the received light is transmitted through a high-pass filter to filter out the effects of the light flashing from the rotating axle.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A data transmission system for use in an assembly which includes a frame and an axle rotatably mounted on the frame, and which also includes at least one transducer circuit on the axle for generating a signal, and a signal processing circuit on the frame, comprising:
   an optical transmitter device having an input connected to said transducer circuit and mounted on said axle, said transmitter device having at least one light emitting optical element; and
   an optical receiver deivde having an output connected to said processing circuit and mounted on said frame opposite said transmitter device, said receiver device having at least one light sensitive optical element;
   said transmitter device including a plurality of light emitting optical elements angularly spaced about the axis of rotation of the shaft assembly, said receiver device forming a high pass filter and said transmitter device constructed to drive said optical element at a frequency which is a plurality of times greater than the 3 db cutoff frequency of said high pass filter.

2. The system described in claim 1 wherein:
   said light sensitive element is located far enough from the axis of rotation of the axle, that it is outside the circle of interrupted illumination within which the half power beam widths from said transmitter device do not overlap.

3. The system described in claim 1 including:
   an auxiliary optical transmitter located on said frame and an auxiliary optical receiver located on said shaft and coupled to said transducer circuit, said transducer circuit including switch means responsive to said auxiliary receiver for terminating full power operation of said transducer circuit.

4. A monitoring system that includes a frame and an axle assembly rotatably mounted on the frame, comprising:
   a plurality of transducer circuits, each including a transducer mounted on said axle assembly;
   an optical transmitter device which includes at least three light emitting elements mounted on said axle assembly at locations angularly spaced about the axis of the axle assembly, and means connected to said transducer circuits and to said elements to drive said elements in synchronism and with a modulation dependent upon the outputs of said transducer circuits; and an optical receiver device which includes a photosensitive element mounted on said frame at a position to receive light from said emitting elements for generating electrical signals dependent on light received from said transmitter device, said receiver device including means for filtering out electrical signal components from said photosensitive element which represent variations in light intensity arising from rotation of said emitter elements with said axle assembly.

5. The system described in claim 4 including:

an auxiliary transmitter device mounted on said frame and including a light emitting element; and an auxiliary receiver device mounted on said axle assembly and including at least three light sensitive elements mounted on said axle assembly at locations angularly spaced about the axle assembly axis, and means coupling said elements to at least one of said transducer circuits to control it.

6. A method for transmitting data between a transducer on an axle and a processing circuit on a frame, comprising:

energizing a plurality of light emitting elements that are angularly spaced about the axis of the axle and are mounted on the axle, substantially in synchronism with information signals from said transducer;

establishing a light sensitive element on said frame at a position to receive light from said emitting elements, to generate signals representing the information signals delivered to said emitting elements; and filtering out low frequency components of signals generated by said light sensitive element, and passing higher frequency components to said processing circuit.

7. A data interface for transmitting data between a rotatable circuit having a data output and located on a rotatable member and a relative stationary circuit on a relatively stationary member, comprising:

an optical transmitter device which includes a plurality of light emitting elements mounted on said rotatable member at locations angularly spaced about its axis of rotation, and means connected to said rotatablr circuit and to said elements to drive said elements in synchornism and with a modulation dependent upon the output of said rotatable circuit; and an optical receiver device which includes a photosensitive element mounted on said stationary member at a position to receive light from said emitting elements, and means connecting said receiver device to said stationary circuit including filter means for stopping the passage of signals of frequencies equal to the frequencies generated by rotation of said emitting elements in the absence of modulation.

8. The system described in claim 7 wherein:

said photosensitive element is located far enough from the axis of rotation, that it is outside the circle of interrupted illumination within which the half power beam widths from said transmitter device do not overlap.

9. A data interface for transmitting data between a rotatable circuit having a data output and located on a rotatable member and a relative stationary circuit on a relatively stationary member, comprising:

an optical transmitter device which includes a light emitting element mounted on said rotatable member and means connected to said rotatable circuit and to said element to drive said element with a modulation dependent upon the output of said rotatable circuit; and an optical receiver device which includes a plurality of photosensitive element mounted on said stationary member at positions to receive light from said emitting elements, with said positions angularly spaced about the axis of rotation of said rotatable member, and means connecting said receiver device to said stationary circuit including a filter that filters out signals arising from variations in light reaching said receiver device arising solely by reason of rotation of said light emitting element.

10. A data transmission system for use in an assembly which includes a frame and an axle rotatably mounted on the frame, and which also includes at least one transducer circuit on the axle for generating a signal, and a signal processing circuit on the frame, comprising:

an optical transmitter device having an input connected to said transducer circuit and mounted on said axle, said transmmitter device having at least one light emitting optical element, and an optical receiver device having an output connected to said processing circuit and mounted on said frame opposite said transmitter device, said receiver device having at least one light sensitive optical element;

said receiver device including a plurality of light sensitive optical elements angularly spaced abou the axis of rotation of the shaft assembly, said receiver device forming a high pass filter and said transmitter device constructed to drive said optical element at a frequency which is a plurality of times greater than the 3 db cut-off frequency of said high pass filter.

* * * * *